US011967347B2

(12) United States Patent
Ogawa

(10) Patent No.: US 11,967,347 B2
(45) Date of Patent: Apr. 23, 2024

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Masakazu Ogawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 598 days.

(21) Appl. No.: 16/866,504

(22) Filed: May 4, 2020

(65) Prior Publication Data
US 2021/0201957 A1    Jul. 1, 2021

(30) Foreign Application Priority Data

Dec. 25, 2019  (JP) ................................. 2019-234336

(51) Int. Cl.
*G11B 27/34* (2006.01)
*G11B 27/036* (2006.01)
*H04N 21/488* (2011.01)

(52) U.S. Cl.
CPC ............ *G11B 27/34* (2013.01); *G11B 27/036* (2013.01); *H04N 21/4884* (2013.01)

(58) Field of Classification Search
CPC ... G11B 27/34; G11B 27/036; H04N 21/4884
See application file for complete search history.

(56) References Cited

U.S. PATENT DOCUMENTS

| 2007/0140656 | A1  | 6/2007 | Ergin    |            |
|--------------|-----|--------|----------|------------|
| 2015/0055932 | A1* | 2/2015 | Nakajima | G11B 19/02 |
|              |     |        |          | 386/228    |
| 2021/0042464 | A1* | 2/2021 | Hwang    | G06F 16/338|

FOREIGN PATENT DOCUMENTS

| JP | 2003224773 | 8/2003 |
| JP | 2003224807 | 8/2003 |
| JP | 2008312066 | 12/2008 |
| JP | 2014116828 | 6/2014 |

OTHER PUBLICATIONS

"Office Action of Japan Counterpart Application", dated Jan. 9, 2024, with English translation thereof, p. 1-p. 6.

* cited by examiner

*Primary Examiner* — Thai Q Tran
*Assistant Examiner* — Jose M Mesa
(74) *Attorney, Agent, or Firm* — JCIPRNET

(57) ABSTRACT

An information processing apparatus includes a memory, and a processor, in which the memory stores a motion picture, a subtitle set in the motion picture, and a display starting time point and a display ending time point of the subtitle, and the processor is configured to display the subtitle in the motion picture being played back in accordance with a current playback time point and display notification information for notifying a user that the current playback time point is a specific time before or after a time point at which display of the subtitle is started or ended at the specific time before or after the display starting time point or the display ending time point of the subtitle in the motion picture.

10 Claims, 16 Drawing Sheets

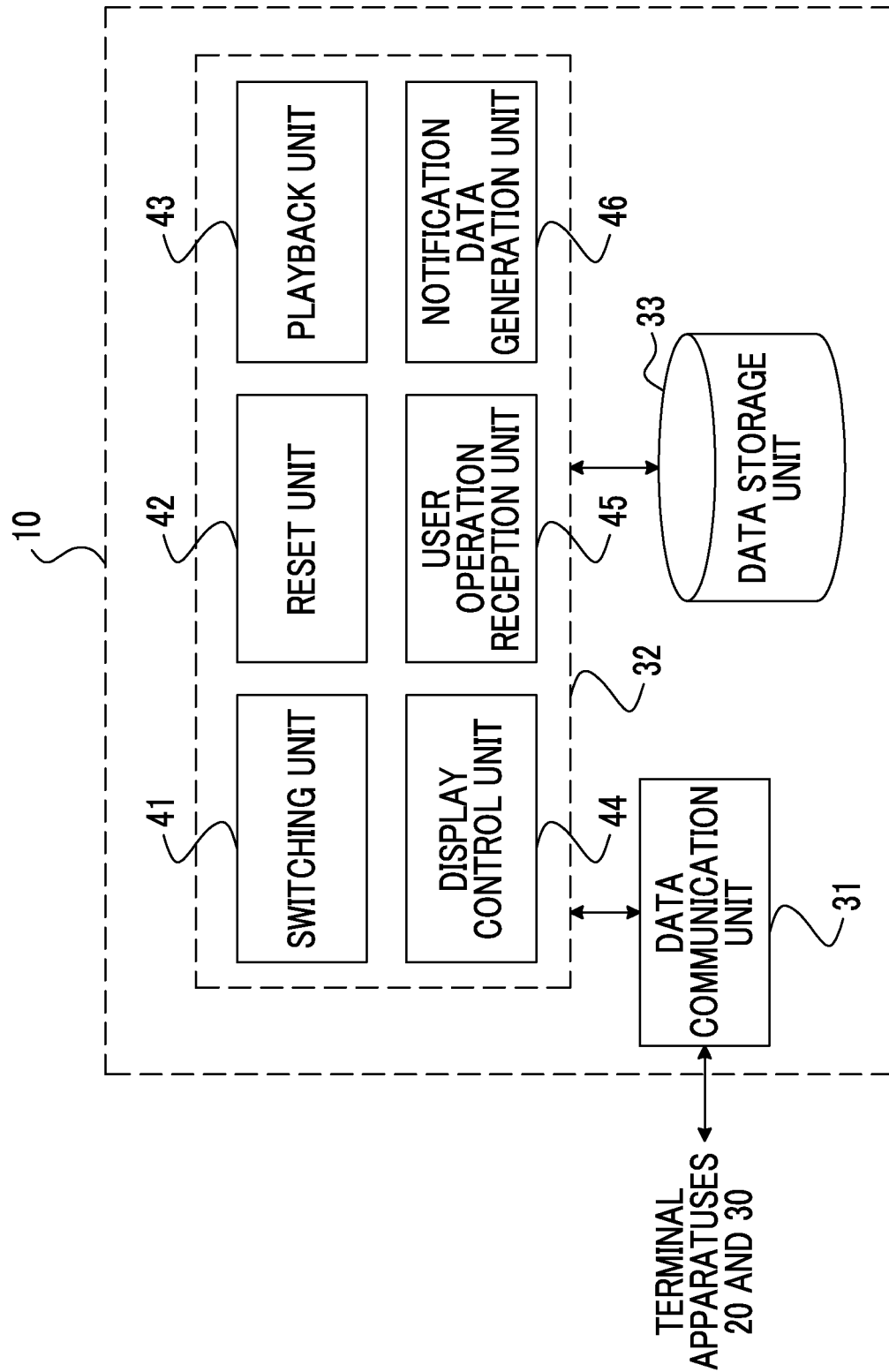

FIG. 4A

| SUBTITLE | DISPLAY STARTING TIME POINT | DISPLAY ENDING TIME POINT |
|---|---|---|
| GRANDFATHER HAS GONE TO MOUNTAIN FOR FIREWOOD AND GRANDMOTHER HAS GONE TO RIVER FOR LAUNDRY | 0:00:15.0 | 0:00:25.0 |

FIG. 4B

| START | SUBTITLE | DISPLAY STARTING TIME POINT | DISPLAY ENDING TIME POINT | END | SUBTITLE | DISPLAY STARTING TIME POINT | DISPLAY ENDING TIME POINT |
|---|---|---|---|---|---|---|---|
| THREE SECONDS BEFORE | THREE SECONDS BEFORE START (GRANDFATHER HAS GONE TO MOUNTAIN ...) | 0:00:12.0 | 0:00:13.0 | THREE SECONDS BEFORE | THREE SECONDS BEFORE END | 0:00:22.0 | 0:00:23.0 |
| TWO SECONDS BEFORE | TWO SECONDS BEFORE START (GRANDFATHER HAS GONE TO MOUNTAIN ...) | 0:00:13.0 | 0:00:14.0 | TWO SECONDS BEFORE | TWO SECONDS BEFORE END | 0:00:23.0 | 0:00:24.0 |
| ONE SECOND BEFORE | ONE SECOND BEFORE START (GRANDFATHER HAS GONE TO MOUNTAIN ...) | 0:00:14.0 | 0:00:15.0 | ONE SECOND BEFORE | ONE SECOND BEFORE END | 0:00:24.0 | 0:00:25.0 |
| ZERO SECONDS | ZERO SECONDS FOR START | 0:00:15.0 | 0:00:16.0 | ZERO SECONDS | ZERO SECONDS FOR END (... LAUNDRY) | 0:00:25.0 | 0:00:26.0 |
| ONE SECOND AFTER | ONE SECOND AFTER START | 0:00:16.0 | 0:00:17.0 | ONE SECOND AFTER | ONE SECOND AFTER END (... LAUNDRY) | 0:00:26.0 | 0:00:27.0 |
| TWO SECONDS AFTER | TWO SECONDS AFTER START | 0:00:17.0 | 0:00:18.0 | TWO SECONDS AFTER | TWO SECONDS AFTER END (... LAUNDRY) | 0:00:27.0 | 0:00:28.0 |
| THREE SECONDS AFTER | THREE SECONDS AFTER START | 0:00:18.0 | 0:00:19.0 | THREE SECONDS AFTER | THREE SECONDS AFTER END (... LAUNDRY) | 0:00:28.0 | 0:00:29.0 |

PLAYBACK MODE

EDITING MODE

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-234336 filed Dec. 25, 2019.

BACKGROUND

(i) Technical Field

The present invention relates to an information processing apparatus and a non-transitory computer readable medium storing a program.

(ii) Related Art

JP2003-224773A discloses a subtitle editing and preview assistance system including a section that associates a display starting timing and a display ending timing of a display unit subtitle of a target of editing with corresponding timing positions on a timeline denoting an elapse in time of a broadcasting program of the target of editing as a time axis, a section that displays a display starting position and an ending position of the display unit subtitle by matching the display starting position and the ending position to the display starting timing and the ending timing of the subtitle associated on the timeline, and a section that corrects the display starting timing or the display ending timing of the display unit subtitle by moving the displayed display starting position or the displayed ending position of the display unit subtitle.

JP2003-224807A discloses a subtitled broadcasting program editing assistance system that is a system assisting subtitled broadcasting program editing of creating a final subtitled broadcasting program by correcting created subtitled broadcasting program data and includes a display section that, at the time of performing a linefeed or a page break in a subtitle screen editing work, displays a post-correction subtitle screen of the subtitle screen and displays the post-correction subtitle screens before and after reflection of the correction in parallel.

SUMMARY

In the case of performing an editing operation of providing a subtitle to a motion picture, a display timing of the subtitle provided to the motion picture may be intended to be changed by shifting the display timing forward or rearward.

However, in normal playback of the motion picture, a display of the subtitle is suddenly started during playback of the motion picture, and the display of the displayed subtitle is finished. Thus, a user may not easily recognize a starting timing or an ending timing of the display of the subtitle.

Consequently, the user needs to record a display starting time point and a display ending time point of the subtitle of which the display timing is intended to be changed while playing back the motion picture, and perform adjustment by repeatedly playing back the same content by rewinding playback of the motion picture. Adjusting the display timing of the subtitle forward or rearward is not easy.

Aspects of non-limiting embodiments of the present disclosure relate to an information processing apparatus and a non-transitory computer readable medium storing a program that, in a case of adjusting a display timing of a subtitle provided to a motion picture, cause a user to more easily recognize the display timing of the subtitle than in a case where notification information for notifying the user that the current playback time point is a specific time before or after a time point at which display of the subtitle is started or ended is not displayed before or after a display starting time point and a display ending time point of the subtitle.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a memory, and a processor, in which the memory stores a motion picture, a subtitle set in the motion picture, and a display starting time point and a display ending time point of the subtitle, and the processor is configured to display the subtitle in the motion picture being played back in accordance with a current playback time point and display notification information for notifying a user that the current playback time point is a specific time before or after a time point at which display of the subtitle is started or ended at the specific time before or after the display starting time point or the display ending time point of the subtitle in the motion picture.

BRIEF DESCRIPTION OF THE DRAWINGS

Exemplary embodiment(s) of the present invention will be described in detail based on the following figures, wherein:

FIG. 3 is a block diagram illustrating a functional configuration of the editing processing server 10 according to one exemplary embodiment of the present invention;

FIG. 4A is a diagram illustrating one example of subtitle data stored in a data storage unit 33 of the editing processing server 10, and FIG. 4B is a diagram illustrating one example of notification data generated from the subtitle data in FIG. 4A;

DETAILED DESCRIPTION

Next, an exemplary embodiment of the present invention will be described in detail with reference to the drawings.

Figure 1:
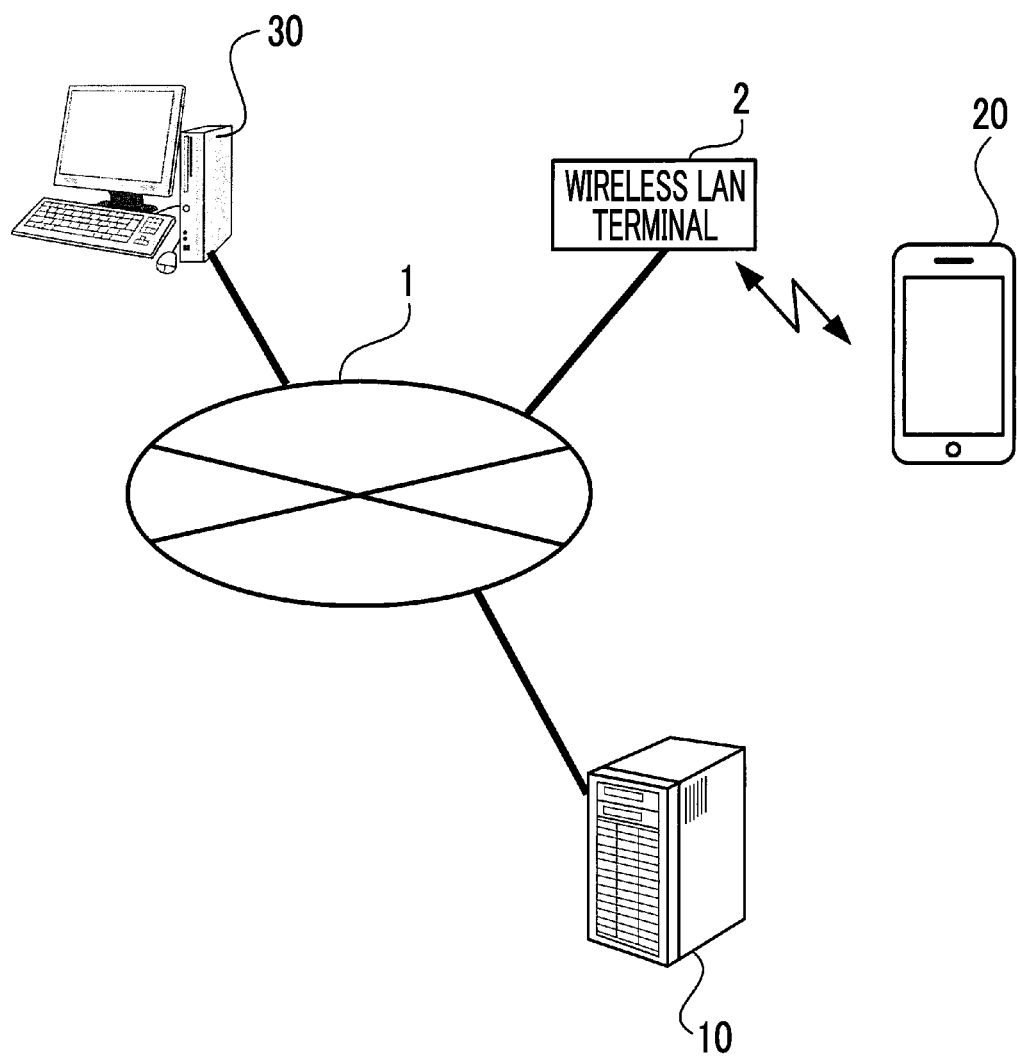
FIG. 1 is a system diagram illustrating a configuration of a multimedia content generation system according to one exemplary embodiment of the present invention.

FIG. 1 is a system diagram illustrating a configuration of a multimedia content generation system according to one exemplary embodiment of the present invention.

As illustrated in FIG. 1, the multimedia content generation system according to one exemplary embodiment of the present invention is configured with an editing processing server 10 and a terminal apparatus 30 such as a personal computer (hereinafter, abbreviated to personal com) connected to each other through a network 1 and a terminal apparatus 20 such as a smartphone or a tablet terminal connected by a wireless line through a wireless LAN terminal 2.

The multimedia content generation system of this exemplary embodiment generates a multimedia content into which various contents such as a motion picture, a still picture, a voice, a text, and an automatic translation are combined. According to the multimedia content generation system of this exemplary embodiment, for example, the multimedia content may be generated by storing data for providing a subtitle to the motion picture in the editing processing server 10 by the terminal apparatus 30 or adjusting a display timing of the subtitle provided to the motion picture in the data stored in the editing processing server 10 by shifting the display timing forward or rearward by the terminal apparatus 20.

The subtitle refers to information that is additional information for the motion picture such as an explanation, a conversation, and a translation displayed on a screen of the motion picture such as a movie or a television program using a text.

The editing processing server 10 is an information processing apparatus on which editing software for generating the multimedia content by editing such various contents is installed. The terminal apparatus 20 and the terminal apparatus 30 are information processing apparatuses that acquire the motion picture and generate the multimedia content using the editing software operating on the editing processing server 10.

The editing software may not be installed on the editing processing server 10. Instead, the editing software may be directly installed on the terminal apparatus 20 and the terminal apparatus 30.

Figure 2:
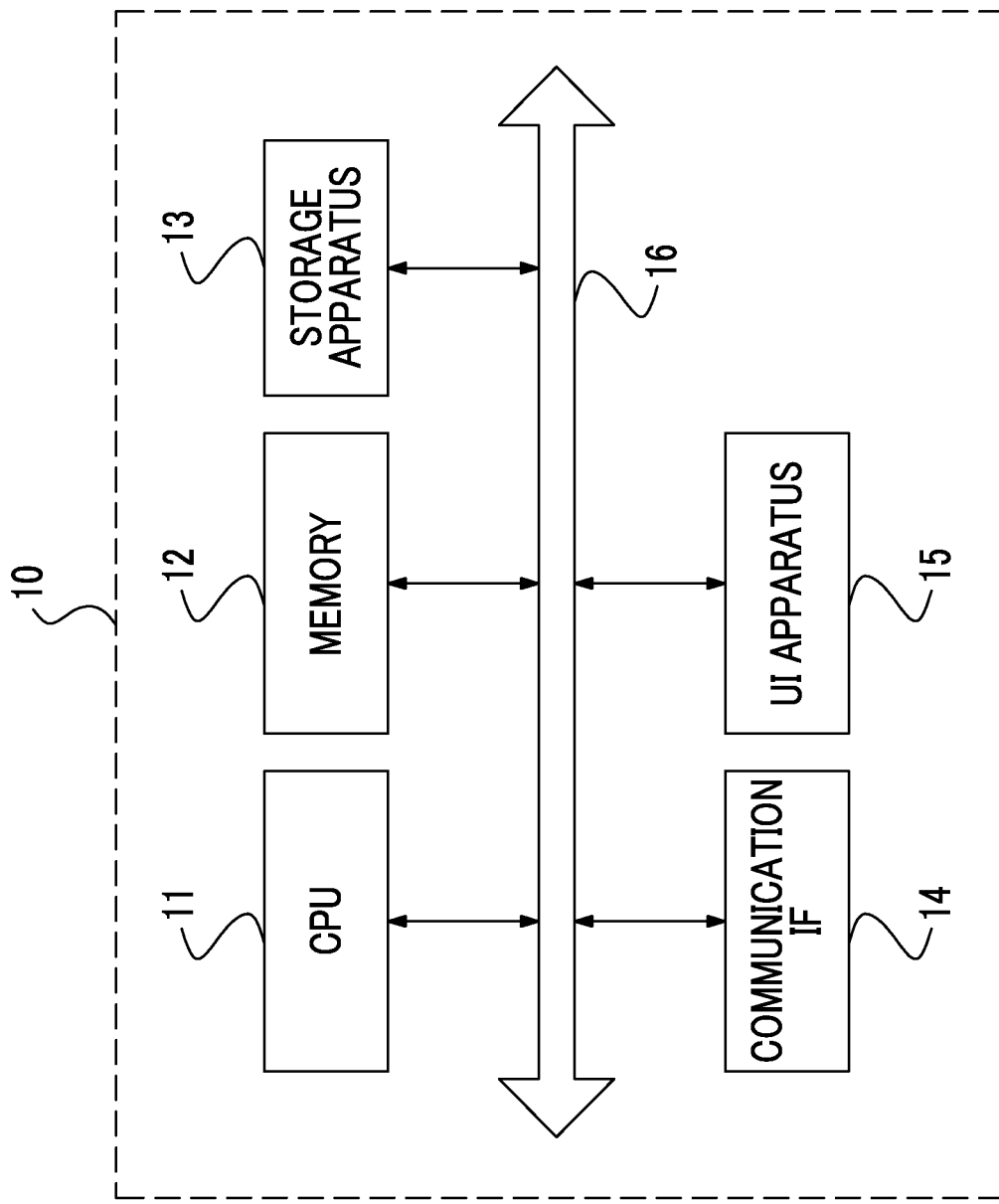
FIG. 2 is a block diagram illustrating a hardware configuration of an editing processing server 10 according to one exemplary embodiment of the present invention.

Next, a hardware configuration of the editing processing server 10 in the multimedia content generation system of this exemplary embodiment is illustrated in FIG. 2.

As illustrated in FIG. 2, the editing processing server 10 includes a CPU 11, a memory 12, a storage apparatus 13 such as a hard disk drive (HDD), a communication interface (IF) 14 transmitting and receiving data to and from an external apparatus or the like such as the terminal apparatuses 20 and 30 through the network 1, and a user interface (UI) apparatus 15 including a touch panel or a liquid crystal display, and a keyboard. These constituents are connected to each other through a control bus 16.

The CPU 11 controls the operation of the editing processing server 10 by executing a predetermined process based on a control program stored in the memory 12 or the storage apparatus 13. In this exemplary embodiment, the CPU 11 is described as reading and executing the control program stored in the memory 12 or the storage apparatus 13. Alternatively, the program may be stored in a storage medium such as a CD-ROM and provided to the CPU 11.

FIG. 3 is a block diagram illustrating a functional configuration of the editing processing server 10 implemented by executing the control program.

As illustrated in FIG. 3, the editing processing server 10 of this exemplary embodiment includes a data communication unit 31, a control unit 32, and a data storage unit 33.

The data communication unit 31 performs data communication with the terminal apparatuses 20 and 30 through the network 1.

The control unit 32 controls the operation of the editing processing server 10 and includes a switching unit 41, a reset unit 42, a playback unit 43, a display control unit 44, a user operation reception unit 45, and a notification data generation unit 46.

The data storage unit 33 stores various content data such as the motion picture on which an editing process is to be performed.

The display control unit 44 controls a screen displayed on the terminal apparatuses 20 and 30.

The user operation reception unit 45 receives a location selected by a user in the terminal apparatuses 20 and 30.

The playback unit 43 plays back the motion picture from a playback time point corresponding to the location received by the user operation reception unit 45 in the case of playing back the motion picture in which the subtitle is set.

The reset unit 42 resets a display starting time point or a display ending time point of the subtitle set in the motion picture.

The switching unit 41 switches between an editing mode in which the display starting time point or the display ending time point of the subtitle set in the motion picture is reset, and a playback mode in which the motion picture is played back.

The notification data generation unit 46 generates the subtitle set in the motion picture, a subtitle as notification information for notifying the user of a specific time before or after the display starting time point or the display ending time point of the subtitle based on the display starting time point and the display ending time point of the subtitle, and a subtitle as specific information as information for specifying the subtitle to be notified to the user in the case of notifying the user of the specific time before the display starting time point of the subtitle or the specific time after the display ending time point, and stores display starting time points and display ending time points of these subtitles in the data storage unit 33 in association with each other as notification data. Examples of the notification information are exemplified by "0 seconds before a subtitle display" "0 seconds after the start", and "0 seconds before the end". Examples of the specific information are exemplified by at least a part of the subtitle set in the motion picture.

The display control unit 44 displays the subtitle as the notification information and the subtitle as the specific information in the motion picture being played back in accordance with the current playback time point based on the notification data stored in the data storage unit 33.

That is, in the case of the editing mode, the display control unit 44 displays the subtitle in the motion picture being played back in accordance with the current playback time point and displays the subtitle as the notification information for notifying the user that the current playback time point is the specific time before or the time after the display starting or ending time point of the subtitle at the specific time before or after the display starting time point or the display ending time point of the subtitle in the motion picture.

In the case of notifying the user of the specific time before the display starting time point of the subtitle or the specific time after the display ending time point, the display control unit 44 displays the subtitle as the notification information in the motion picture and displays the subtitle as the specific information, for example, at least a part of the subtitle set in the motion picture, in the motion picture being played back in accordance with the current playback time point.

In the case of the playback mode, the display control unit 44 does not display the subtitle as the notification information and the subtitle as the specific information in the motion picture.

FIG. 4A and FIG. 4B are diagrams illustrating one example of data stored in the data storage unit 33.

As illustrated in FIG. 4A, the data storage unit 33 stores the motion picture, the subtitle set in the motion picture, and the display starting time point and the display ending time point of the subtitle in association with each other as subtitle data.

Based on the subtitle data illustrated in FIG. 4A, the notification data generation unit 46, for example, as illustrated in FIG. 4B, generates the subtitle as the notification information for notifying the user of three seconds before or after the start, two seconds before or after the start, one second before or after the start, zero seconds for the start, three seconds before or after the end, two seconds before or after the end, one second before or after the end, and zero seconds for the end at three seconds before or after, two seconds before or after, and one second before or after each of the display starting time point and the display ending time point of the subtitle set in the motion picture and zero seconds for each of the display starting time point and the display ending time point, and the subtitle as the specific information for specifying the subtitle to be notified to the user in the case of notifying the user of three seconds before, two seconds before, and one second before the display starting time point, zero seconds for the display ending time point, one second after, two seconds after, and three seconds after the display ending time point before the display starting time point or after the display ending time point of the subtitle. The notification data generation unit 46 stores the display starting time points and the display ending time points of these subtitles in the data storage unit 33 in association with each other as the notification data.

Specifically, the display control unit 44 displays the subtitle in the motion picture being played back in accordance with the current playback time point, counts down before the display starting time point of the subtitle from, for example, three seconds before the display starting time point of the subtitle, and displays, in the motion picture, the subtitle as the notification information for three seconds before the start of display of the subtitle, two seconds before the start, and one second before the start and the subtitle "(grandfather has gone to mountain . . . )" as the specific information for at least a part of the subtitle "grandfather has gone to mountain for firewood and grandmother has gone to river for laundry" set in the motion picture.

In addition, the display control unit 44 displays the subtitle in the motion picture being played back in accordance with the current playback time point, counts up from the display starting time point of the subtitle to, for example, three seconds after the display starting time point of the subtitle, and displays, in the motion picture, the subtitle as the notification information for zero seconds for the start of display of the subtitle, one second after the start, two seconds after the start, and three seconds after the start and the subtitle "grandfather has gone to mountain for firewood and grandmother has gone to river for laundry" set in the motion picture.

In addition, the display control unit 44 displays the subtitle in the motion picture being played back in accordance with the current playback time point, counts down before the display ending time point of the subtitle from, for example, three seconds before the display ending time point of the subtitle, and displays, in the motion picture, the subtitle as the notification information for three seconds before the end of display of the subtitle, two seconds before the end, and one second before the end and the subtitle "grandfather has gone to mountain for firewood and grandmother has gone to river for laundry" set in the motion picture.

In addition, the display control unit 44 displays the subtitle in the motion picture being played back in accordance with the current playback time point, counts up from the display ending time point of the subtitle to, for example, three seconds after the display ending time point of the subtitle, and displays, in the motion picture, the subtitle as the notification information for zero seconds for the end of display of the subtitle, one second after the end, two seconds after the end, and three seconds after the end and the subtitle "( . . . laundry)" as the specific information for at least a part of the subtitle "grandfather has gone to mountain for firewood and grandmother has gone to river for laundry" set in the motion picture.

In addition, in the case of displaying the subtitle as the notification information in the motion picture based on the notification data illustrated in FIG. 4B, the display control unit 44 displays a reset button as a reset section, described later, in accordance with the subtitle. The reset button is information for resetting the display starting time point or the display ending time point of the subtitle set in the motion picture.

In a case where the display starting time point or the display ending time point of the subtitle is reset by the reset unit 42, the display control unit 44 displays information for selecting whether or not to change the display ending time point or the display starting time point of the subtitle in accordance with the reset display starting time point or the reset display ending time point of the subtitle in the motion picture.

In a case where "change the display ending time point or the display starting time point of the subtitle in accordance with the reset display starting time point or the reset display ending time point of the subtitle" is received by the user operation reception unit 45, the reset unit 42 changes the display ending time point or the display starting time point of the subtitle in accordance with the reset display starting time point or the reset display ending time point of the subtitle.

In addition, in a case where "do not change the display ending time point or the display starting time point of the subtitle in accordance with the reset display starting time point or the reset display ending time point of the subtitle" is received by the user operation reception unit 45, the reset unit 42 does not change the display ending time point or the display starting time point of the subtitle in accordance with the reset display starting time point or the reset display ending time point of the subtitle.

The reset unit 42 may switch between changing and not changing the display ending time point or the display starting time point of the subtitle depending on whether the reset time point is the display starting time point or the display ending time point of the subtitle. For example, in a case where the display starting time point is reset, the reset unit 42 changes the display ending time point in accordance with the reset display setting time point. In a case where the display ending time point is reset, the reset unit 42 may not change the display starting time point in accordance with the reset display ending time point.

In addition, even in a full screen display state that is a state where the current playback time point such as a seekbar is not displayed in the motion picture being played back, the display control unit 44 may display the subtitle as the notification information, at least a part of the subtitle set in the motion picture which is the subtitle as the specific information, and the reset button as the reset section which is information for resetting performed by the reset unit 42 in the motion picture.

That is, in the editing mode, the display control unit 44 may display the subtitle as the notification information, at least a part of the subtitle set in the motion picture which is the subtitle as the specific information, and the reset button as the reset section which is information for resetting performed by the reset unit 42 in the motion picture even in the full screen display state.

In a case where the display starting time point or the display ending time point of the subtitle is reset, the playback unit 43 plays back the motion picture from, for example, three seconds which is a preset time before the reset display starting time point or the reset display ending time point of the subtitle. Accordingly, in a case where the display of the subtitle is reset, the user may check whether or not the resetting is appropriate.

Next, the operation of the editing processing server 10 in the multimedia content generation system of this exemplary embodiment will be described in detail with reference to the drawings.

Figure 5A:
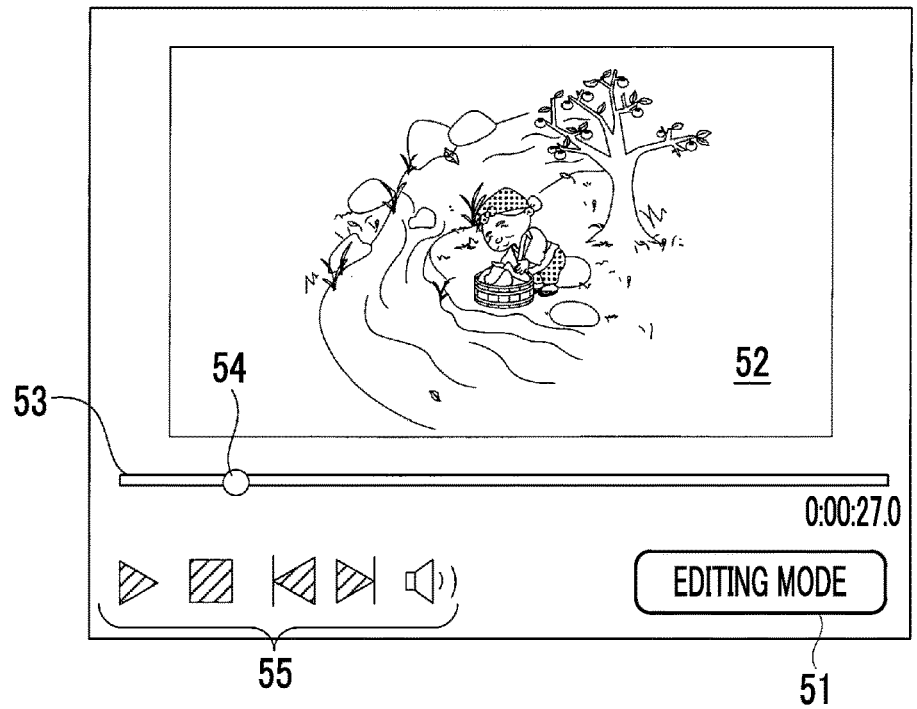
FIG. 5A is a diagram illustrating one example of a display screen displayed on a terminal apparatus 20 in a playback mode.
Figure 5B:
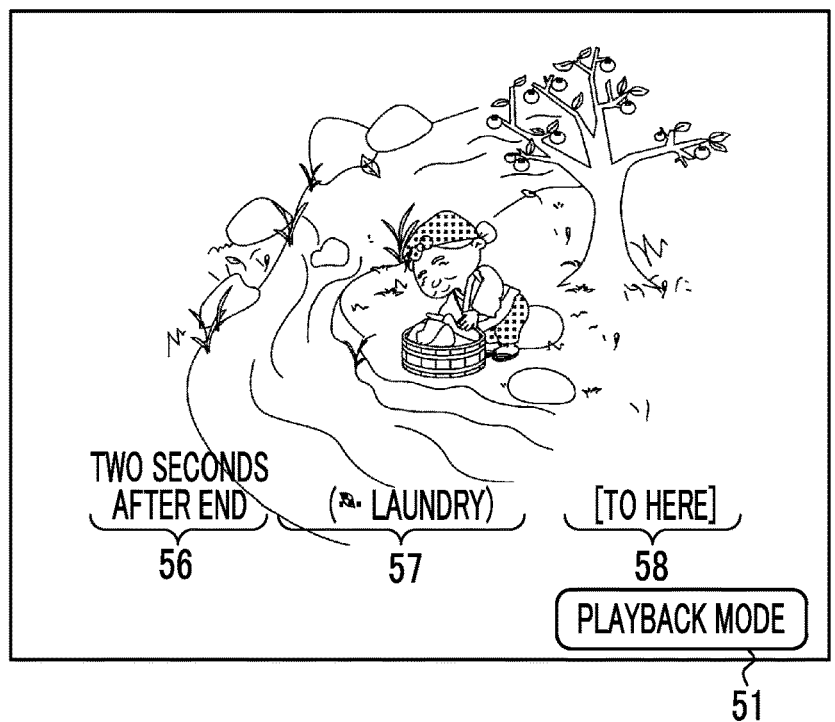
FIG. 5B is a diagram illustrating one example of the display screen displayed on the terminal apparatus 20 in an editing mode.

FIG. 5A is a diagram illustrating a display screen of the terminal apparatus 20 in the playback mode in which the motion picture is played back. FIG. 5B is a diagram illustrating the display screen of the terminal apparatus 20 in the editing mode in which the display timing of the subtitle set in the motion picture is adjusted.

As illustrated in FIG. 5A, in the playback mode, a motion picture display screen 52 on which the motion picture is displayed, a seekbar 53 for switching a playback position of the motion picture, and an operation button 55 such as a playback button, a stop button, a rewind button, a fast forward button, and a volume switching button for the motion picture are displayed. A pointer 54 is displayed on the seekbar 53. The playback position of the motion picture may be switched by moving the pointer 54 on the seekbar 53. In addition, a switching button 51 that is a switching section for switching the display screen of the terminal apparatus 20 in the playback mode to the display screen in the editing mode by the switching unit 41 is displayed.

In a case where the switching button 51 displayed on the display screen of the terminal apparatus 20 in the playback mode is tapped, the display screen of the terminal apparatus 20 is switched to the editing mode illustrated in FIG. 5B.

As illustrated in FIG. 5B, in the editing mode, the motion picture is displayed in full screen on the display screen of the terminal apparatus 20 and is displayed larger than the motion picture in the playback mode. In the motion picture displayed in full screen, a subtitle 56 as the notification information, a subtitle 57 as the specific information, and a reset button 58 for resetting the display starting time point or the display ending time point of the subtitle are displayed. In addition, the switching button 51 for switching the display screen of the terminal apparatus 20 in the editing mode to the display screen in the playback mode is displayed.

In a case where the switching button 51 displayed on the display screen of the terminal apparatus 20 in the editing mode is tapped, the display screen of the terminal apparatus 20 is switched to the playback mode illustrated in FIG. 5A.

That is, the switching button 51 capable of switching between the playback mode and the editing mode is displayed on the display screen of the terminal apparatus 20, and the playback mode and the editing mode are configured to be switchable each time the switching button 51 is tapped.

Tapping refers to an operation of touching the display screen with a finger or the like such as lightly hitting the display screen with a finger, a touch pen, or the like.

Next, one example of the display screen of the terminal apparatus 20 in the editing mode will be specifically described based on FIG. 6A to FIG. 11C. In the following example, a display of the switching button 51 is omitted.

Figure 6A:
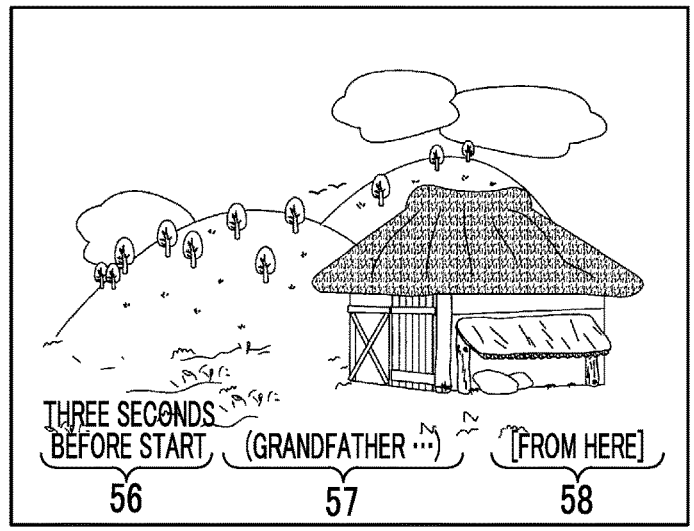
FIG. 6A to FIG. 6C are diagrams illustrating one example of the display screen displayed on the terminal apparatus 20.

At three seconds before the display starting time point of the subtitle during playback of the motion picture, the subtitle 56 as the notification information such as "three seconds before the start", the subtitle 57 as the specific information such as "(grandfather . . . )" which is a part of the subtitle displayed after three seconds, and the reset button 58 for resetting the display starting time point of the subtitle to [from here] which is three seconds before the display starting time point are displayed as illustrated in FIG. 6A.

Figure 6B:
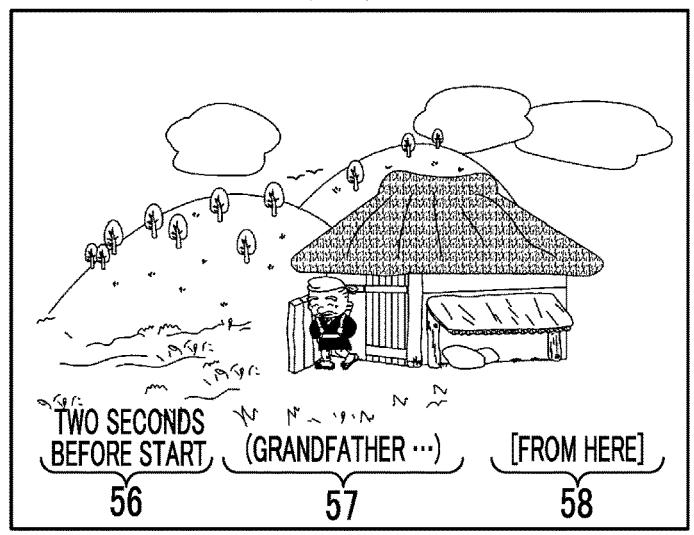

At two seconds before the display starting time point of the subtitle during playback of the motion picture, the subtitle 56 as the notification information such as "two seconds before the start", the subtitle 57 as the specific information such as "(grandfather . . . )" which is a part of the subtitle displayed after two seconds, and the reset button 58 for resetting the display starting time point of the subtitle to [from here] which is two seconds before the display starting time point are displayed as illustrated in FIG. 6B.

Figure 6C:
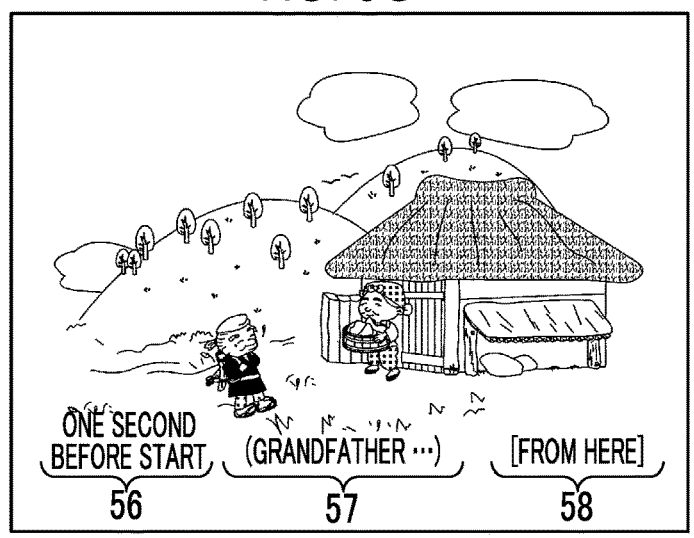

At one second before the display starting time point of the subtitle during playback of the motion picture, the subtitle 56 as the notification information such as "one second before the start", the subtitle 57 as the specific information such as "(grandfather . . . )" which is a part of the subtitle displayed after one second, and the reset button 58 for resetting the display starting time point of the subtitle to [from here] which is one second before the display starting time point are displayed as illustrated in FIG. 6C.

Figure 7:
FIG. 7 is a diagram illustrating one example of the display screen displayed on the terminal apparatus 20.

At the display starting time point of the subtitle during playback of the motion picture, the subtitle 56 as the notification information such as "zero seconds for the start" and the subtitle "grandfather has gone to mountain for firewood and grandmother has gone to river for laundry" set in the motion picture are displayed as illustrated in FIG. 7.

Figure 8A:
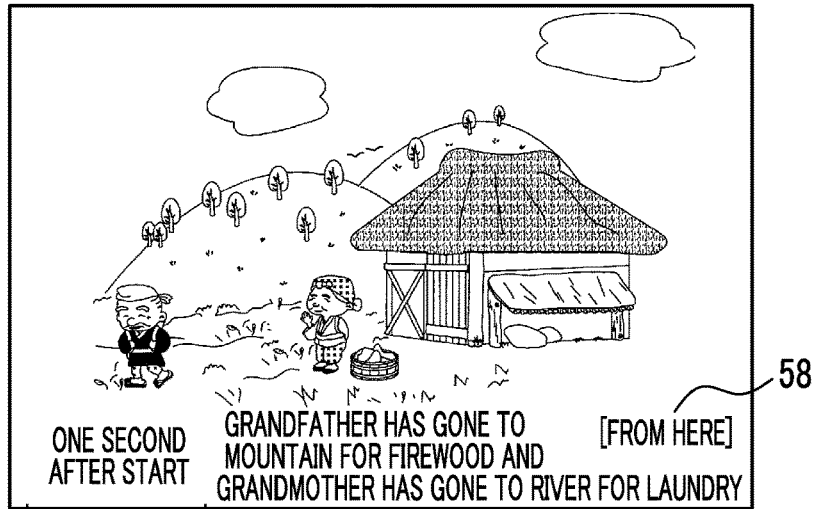
FIG. 8A to FIG. 8C are diagrams illustrating one example of the display screen displayed on the terminal apparatus 20.

At one second after the display starting time point of the subtitle during playback of the motion picture, the subtitle 56 as the notification information such as "one second after the start", the subtitle "grandfather has gone to mountain for firewood and grandmother has gone to river for laundry" set in the motion picture, and the reset button 58 for resetting the display starting time point of the subtitle to [from here] which is one second after the display starting time point are displayed as illustrated in FIG. 8A.

Figure 8B:

At two seconds after the display starting time point of the subtitle during playback of the motion picture, the subtitle 56 as the notification information such as "two seconds after the start", the subtitle "grandfather has gone to mountain for firewood and grandmother has gone to river for laundry" set in the motion picture, and the reset button 58 for resetting the display starting time point of the subtitle to [from here] which is two seconds after the display starting time point are displayed as illustrated in FIG. 8B.

Figure 8C:
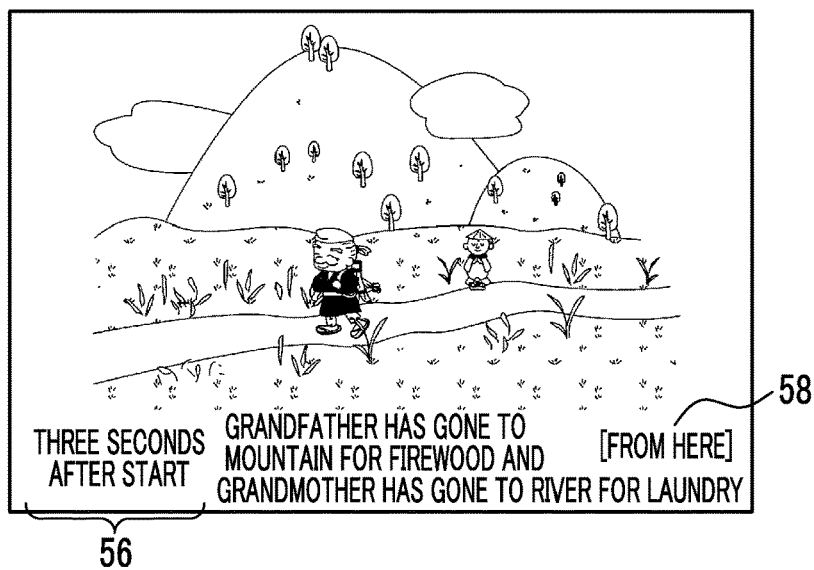

At three seconds after the display starting time point of the subtitle during playback of the motion picture, the subtitle 56 as the notification information such as "three seconds after the start", the subtitle "grandfather has gone to mountain for firewood and grandmother has gone to river for laundry" set in the motion picture, and the reset button 58 for resetting the display starting time point of the subtitle to [from here] which is three seconds after the display starting time point are displayed as illustrated in FIG. 8C.

Figure 9A:
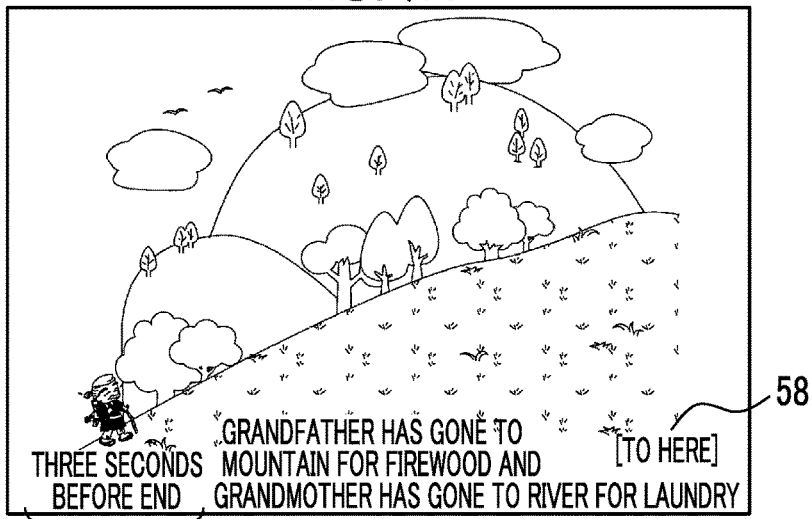
FIG. 9A to FIG. 9C are diagrams illustrating one example of the display screen displayed on the terminal apparatus 20.

At three seconds before the display ending time point of the subtitle during playback of the motion picture, the subtitle 56 as the notification information such as "three seconds before the end", the subtitle "grandfather has gone to mountain for firewood and grandmother has gone to river for laundry" set in the motion picture, and the reset button 58 for resetting the display ending time point of the subtitle to [to here] which is three seconds before the display ending time point are displayed as illustrated in FIG. 9A.

Figure 9B:
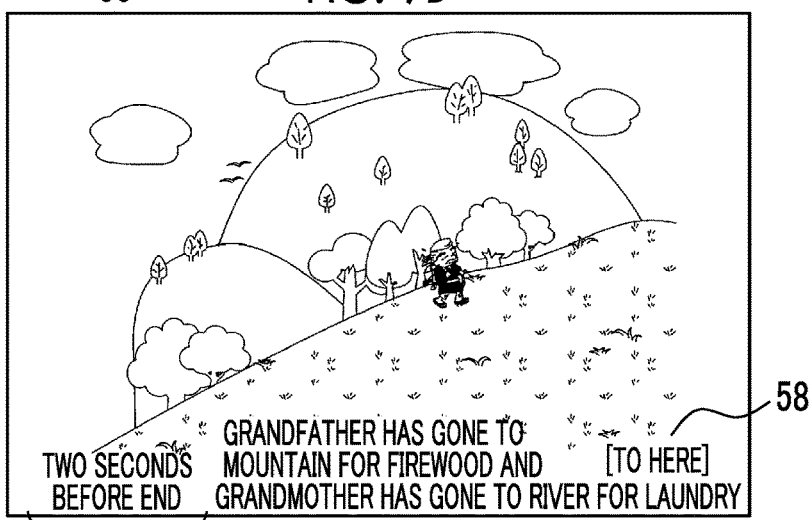

At two seconds before the display ending time point of the subtitle during playback of the motion picture, the subtitle 56 as the notification information such as "two seconds before the end", the subtitle "grandfather has gone to mountain for firewood and grandmother has gone to river for laundry" set in the motion picture, and the reset button 58 for resetting the display ending time point of the subtitle to [to here] which is two seconds before the display ending time point are displayed as illustrated in FIG. 9B.

Figure 9C:
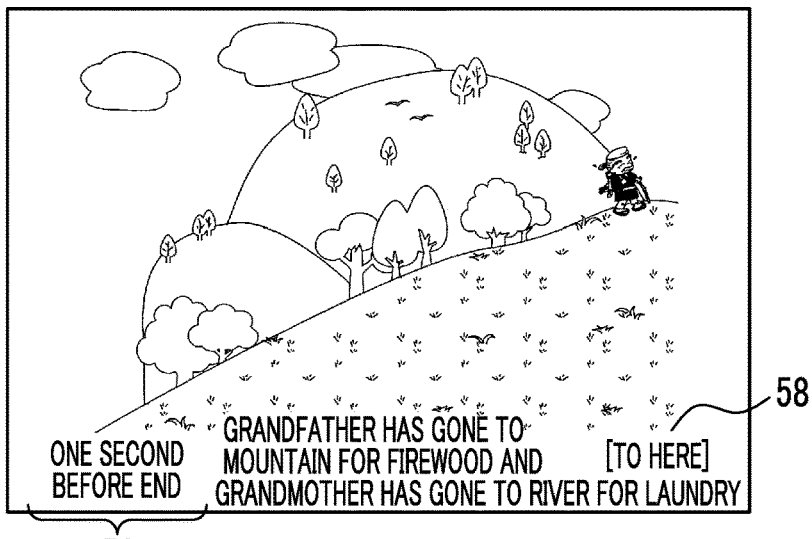

At one second before the display ending time point of the subtitle during playback of the motion picture, the subtitle 56 as the notification information such as "one second before the end", the subtitle "grandfather has gone to mountain for firewood and grandmother has gone to river for laundry" set in the motion picture, and the reset button 58 for resetting the display ending time point of the subtitle to [to here] which is one second before the display ending time point are displayed as illustrated in FIG. 9C.

Figure 10:
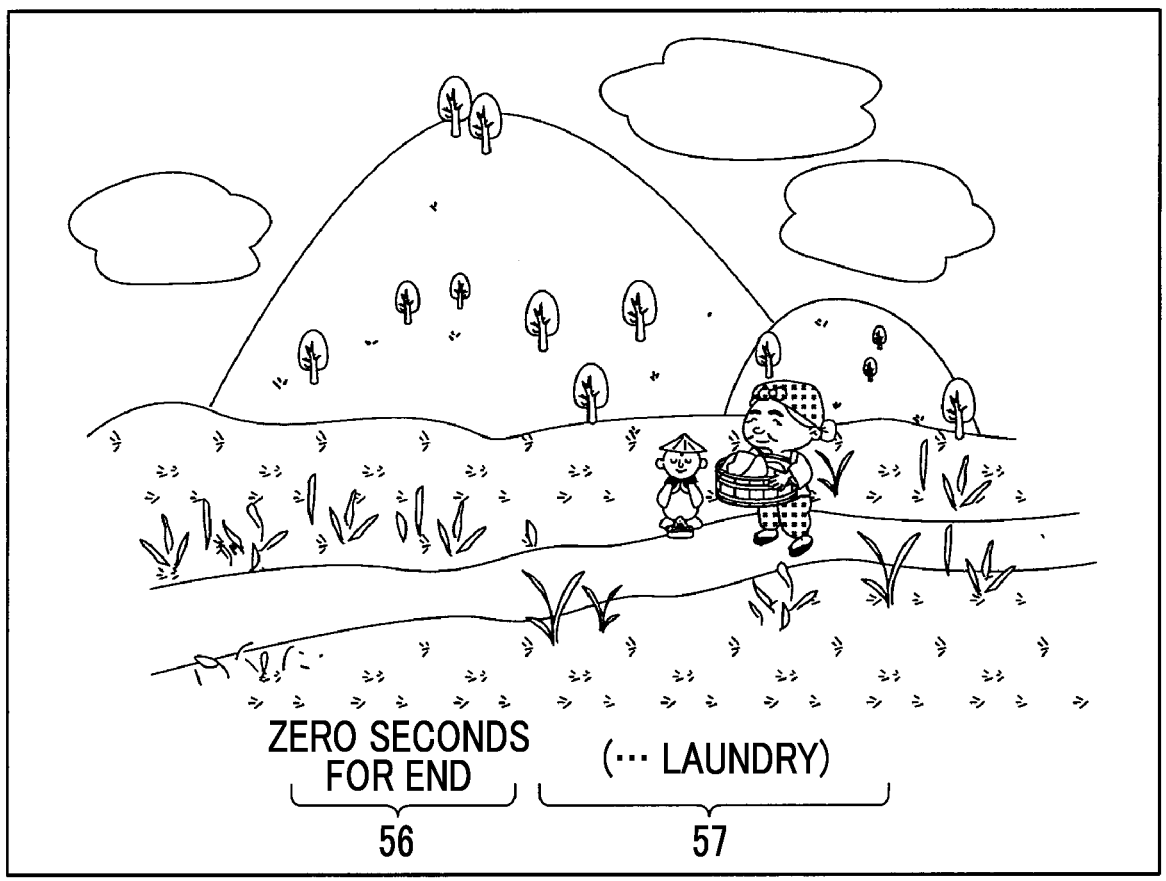
FIG. 10 is a diagram illustrating one example of the display screen displayed on the terminal apparatus 20.

At the display ending time point of the subtitle during playback of the motion picture, the subtitle 56 as the notification information such as "zero seconds for the end" and the subtitle 57 as the specific information such as "( . . . laundry)" which is a part of the subtitle displayed before the end are displayed as illustrated in FIG. 10.

Figure 11A:
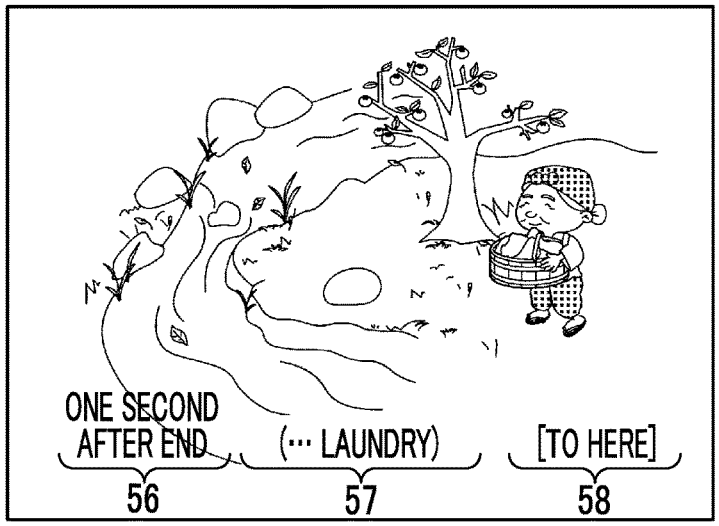
FIG. 11A to FIG. 11C are diagrams illustrating one example of the display screen displayed on the terminal apparatus 20.

At one second after the display ending time point of the subtitle during playback of the motion picture, the subtitle 56 as the notification information such as "one second after the end", the subtitle 57 as the specific information such as "( . . . laundry)" which is a part of the subtitle displayed before one second, and the reset button 58 for resetting the display ending time point of the subtitle to [to here] which is one second after the display ending time point are displayed as illustrated in FIG. 11A.

Figure 11B:
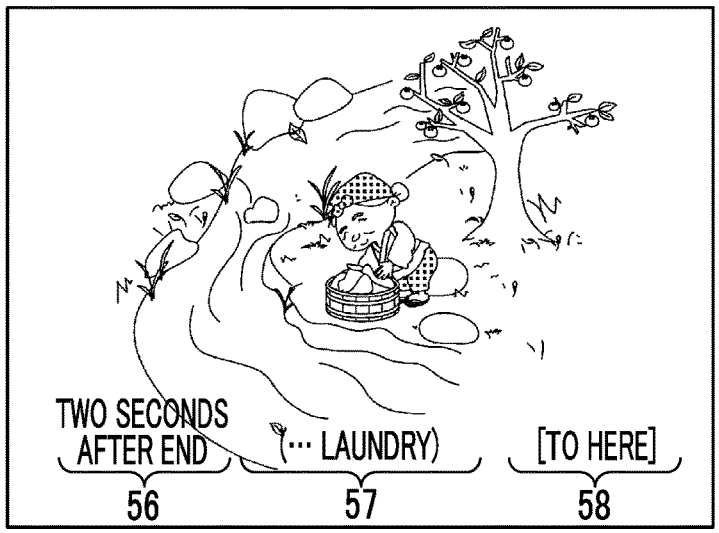

At two seconds after the display ending time point of the subtitle during playback of the motion picture, the subtitle 56 as the notification information such as "two seconds after the end", the subtitle 57 as the specific information such as "( . . . laundry)" which is a part of the subtitle displayed before two seconds, and the reset button 58 for resetting the display ending time point of the subtitle to [to here] which is two seconds after the display ending time point are displayed as illustrated in FIG. 11B.

Figure 11C:
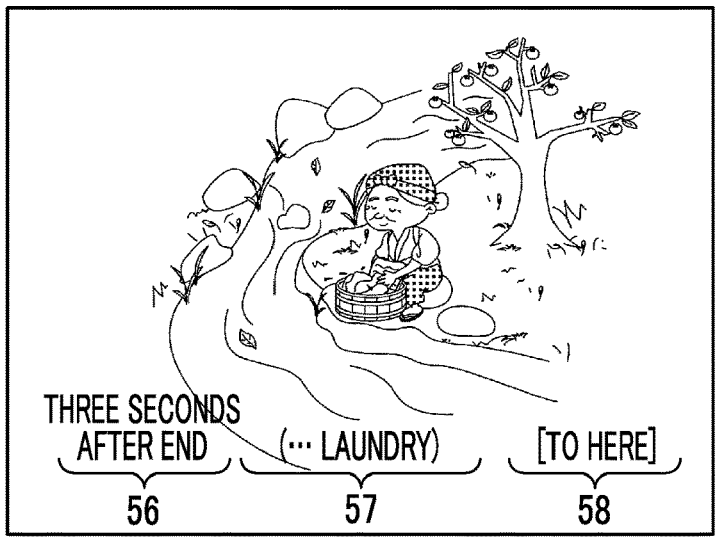

At three seconds after the display ending time point of the subtitle during playback of the motion picture, the subtitle 56 as the notification information such as "three seconds after the end", the subtitle 57 as the specific information such as "( . . . laundry)" which is a part of the subtitle displayed before three seconds, and the reset button 58 for resetting the display ending time point of the subtitle to [to here] which is three seconds after the display ending time point are displayed as illustrated in FIG. 11C.

Next, a summary of operation in the editing processing server 10 will be described using FIG. 12 to FIG. 15B. The summary will be described using a case where the notification data of the display starting time point or the display ending time point of the subtitle generated by the notification data generation unit 46 is stored in the data storage unit 33.

Figure 12:
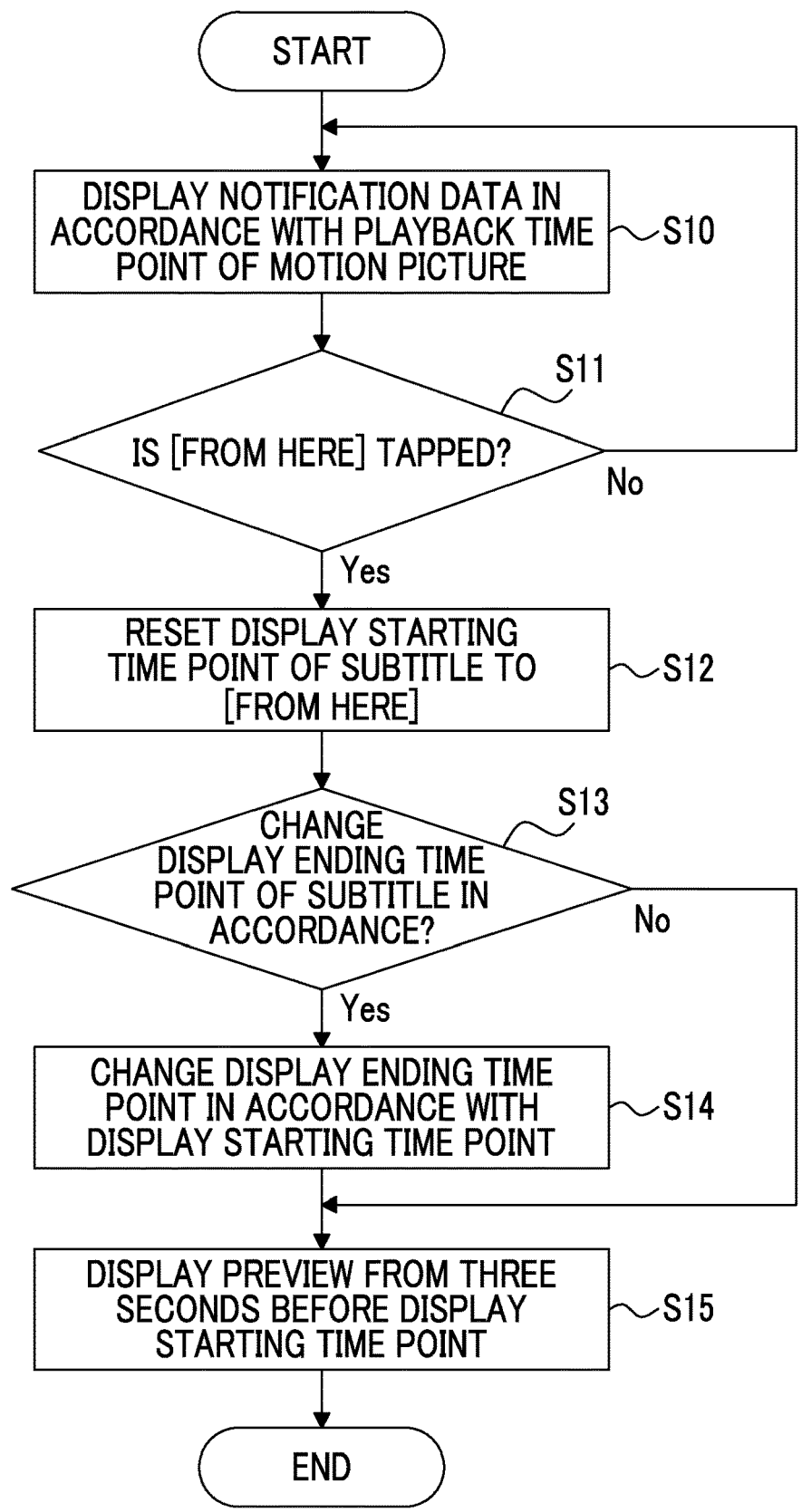
FIG. 12 is a flowchart illustrating a summary of a process in the editing processing server 10 according to one exemplary embodiment of the present invention.

First, the summary of operation in the editing processing server 10 in the case of resetting the display starting time point of the subtitle will be described using FIG. 12 to FIG. 13B.

In step S10, the display control unit 44 displays the notification data in accordance with the playback time point of the motion picture. Specifically, the display control unit 44 displays the subtitle 56 as the notification information which is displayed by counting the time point to the start of display of the subtitle and the time point from the start of display of the subtitle in accordance with the playback time point of the motion picture, and the reset button 58 for resetting the display starting time point of the subtitle to [from here]. In addition, in a case where the playback time point of the motion picture is before the display starting time point of the subtitle, the display control unit 44 displays the subtitle 57 as the specific information in accordance with the subtitle 56 in the case of displaying the subtitle 56.

In step S11, in a case where the reset button 58 of [from here] is tapped, the reset unit 42 in step S12 resets the display starting time point of the subtitle to the time point at which the reset button 58 of [from here] is tapped.

Figure 13A:
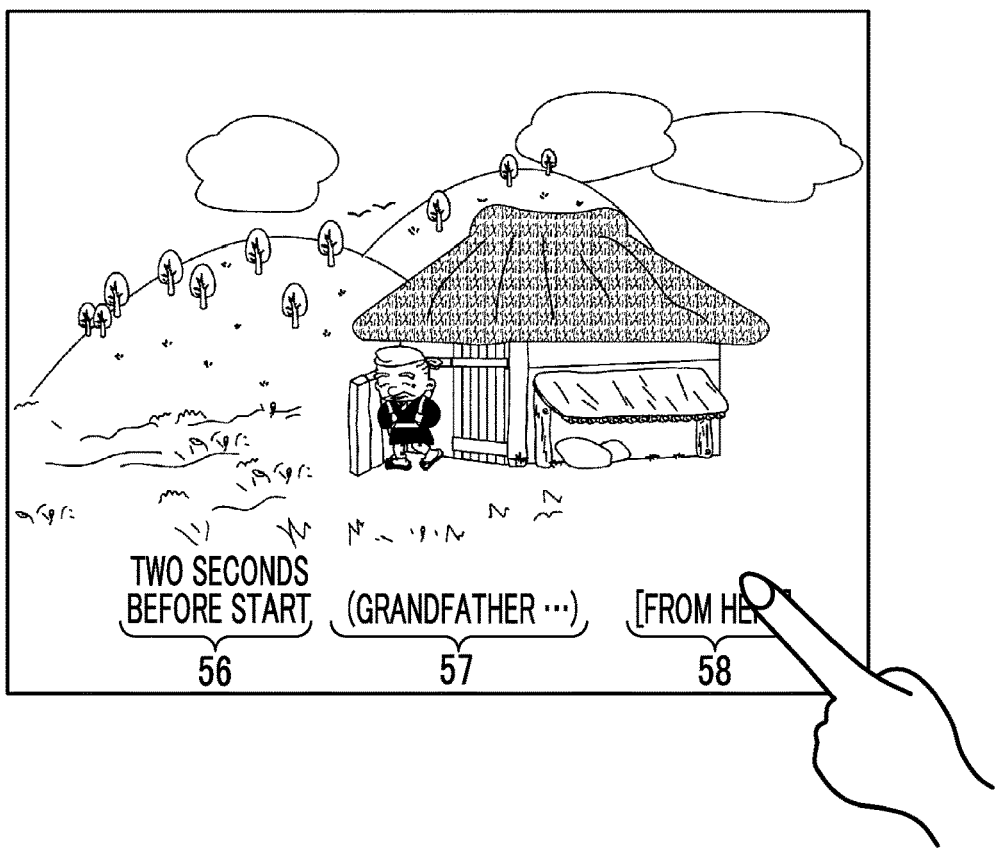
FIG. 13A and FIG. 13B are diagrams illustrating one example of the display screen displayed on the terminal apparatus 20.

Specifically, on the display screen corresponding to the playback time point of the motion picture in the editing mode as illustrated in FIG. 13A, in a case where the reset button 58 of [from here] is tapped in a case where the subtitle 56 as the notification information is "two seconds before the start", the display starting time point of the subtitle is reset to two seconds before the display starting time point of the subtitle at which the reset button 58 is tapped.

Figure 13B:
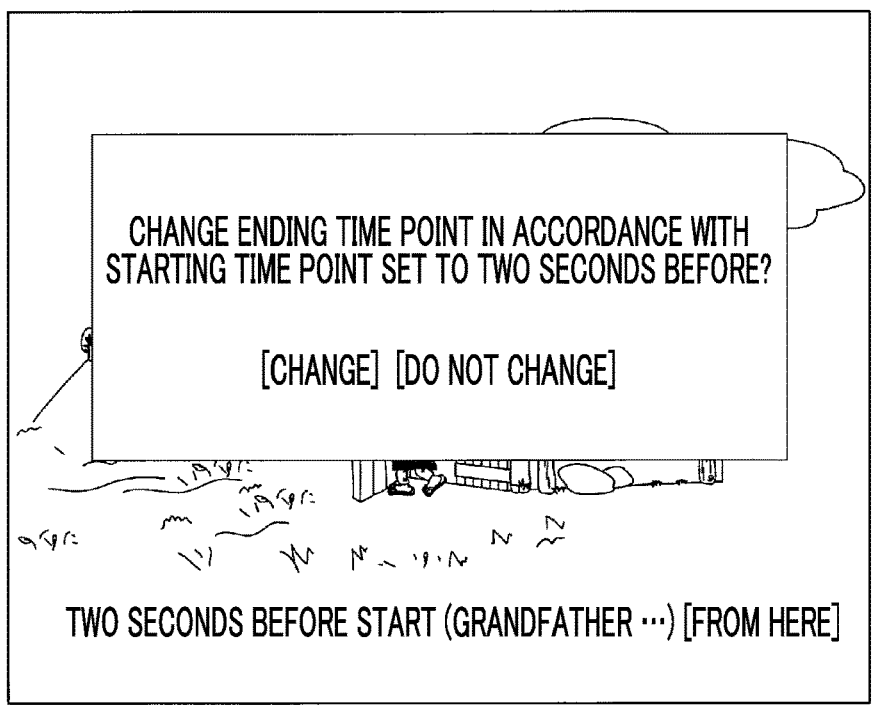

In a case where the display starting time point of the subtitle is reset, a selection screen for selecting whether or not to change the display ending time point in accordance with the reset display starting time point of the subtitle is displayed as illustrated in FIG. 13B.

In step S13, in a case where "do not change" is selected on the selection screen illustrated in FIG. 13B, the playback unit 43 in step S15 plays back the motion picture from three seconds before the reset display starting time point of the subtitle and displays a preview screen using the display control unit 44.

In step S13, in a case where "change" is selected on the selection screen illustrated in FIG. 13B, the reset unit 42 in step S14 changes the display ending time point in accordance with the reset display starting time point of the subtitle. Specifically, in a case where the display starting time point of the subtitle is reset to, for example, two seconds before the display starting time point, the reset unit 42 changes the display ending time point to two seconds before the display ending time point in accordance with the reset display starting time point. In addition, in a case where the display starting time point of the subtitle is reset to, for example, two seconds after the display starting time point, the reset unit 42 changes the display ending time point to two seconds after the display ending time point in accordance with the reset display starting time point.

In step S15, the playback unit 43 plays back the motion picture from three seconds before the reset display starting time point of the subtitle and displays the preview screen using the display control unit 44.

Figure 14:
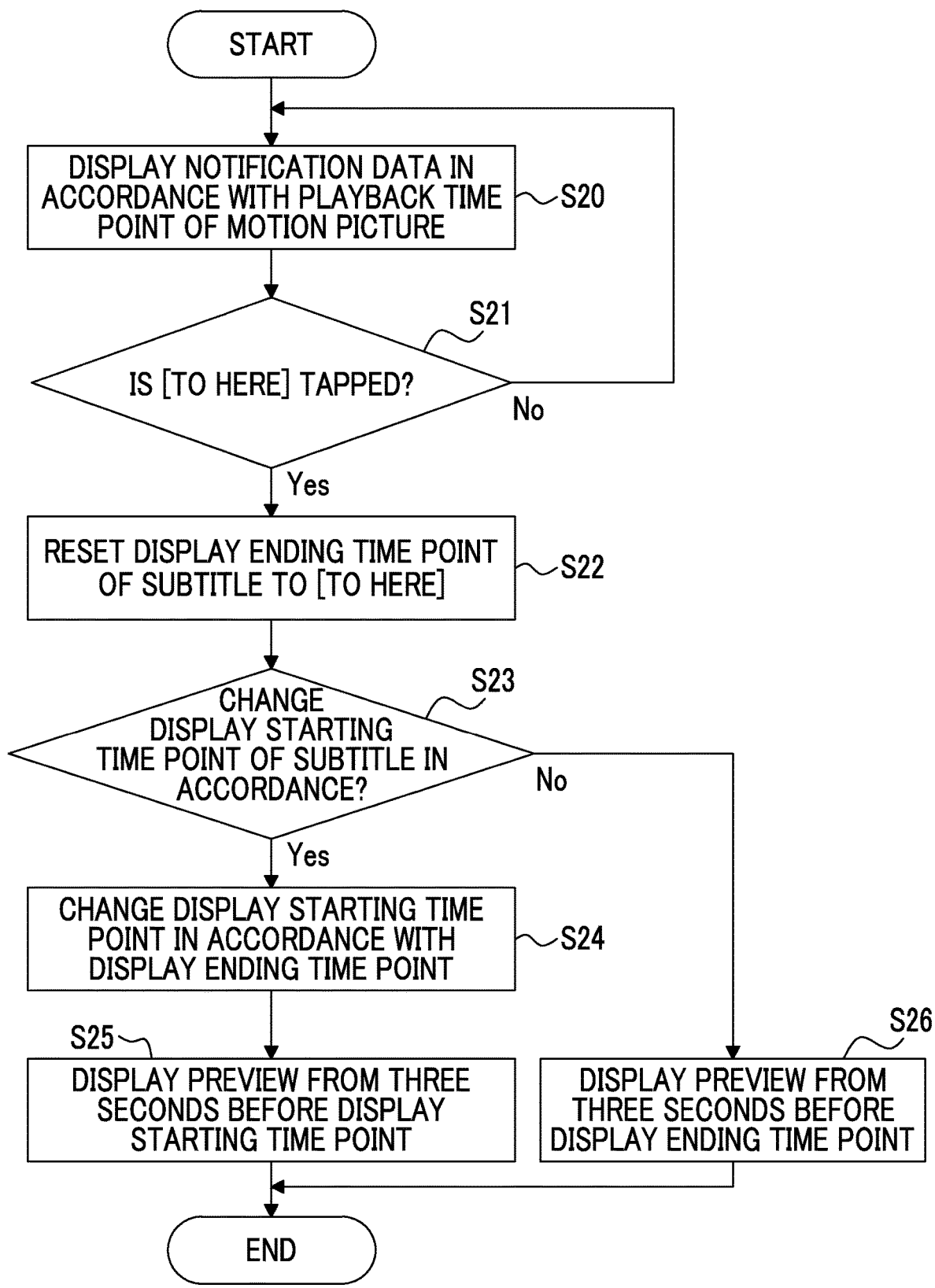
FIG. 14 is a flowchart illustrating a summary of the process in the editing processing server 10 according to one exemplary embodiment of the present invention.

Next, the summary of operation in the editing processing server 10 in the case of resetting the display ending time point of the subtitle will be described using FIG. 14 to FIG. 15B.

In step S20, the display control unit 44 displays the notification data in accordance with the playback time point of the motion picture. Specifically, the display control unit 44 displays the subtitle 56 as the notification information which is displayed by counting the time point to the end of display of the subtitle and the time point from the end of display of the subtitle, and the reset button 58 for resetting the display ending time point of the subtitle to [to here]. In addition, in a case where the playback time point of the motion picture is after the display ending time point of the subtitle, the display control unit 44 displays the subtitle 57 as the specific information in accordance with the subtitle 56 in the case of displaying the subtitle 56.

In step S21, in a case where the reset button 58 of [to here] is tapped, the reset unit 42 in step S22 resets the display ending time point of the subtitle to the time point at which the reset button 58 of [to here] is tapped.

Figure 15A:
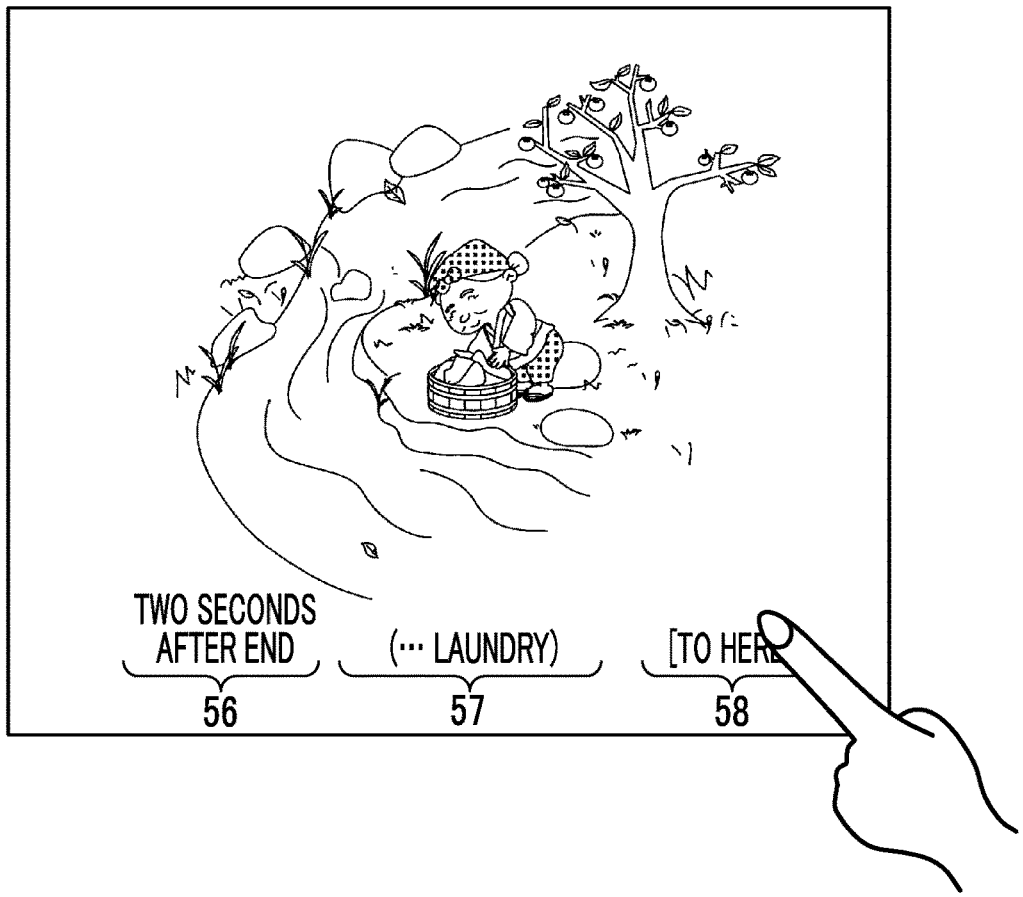
FIG. 15A and FIG. 15B are diagrams illustrating one example of the display screen displayed on the terminal apparatus 20.

Specifically, on the display screen corresponding to the playback time point of the motion picture in the editing mode as illustrated in FIG. 15A, in a case where the reset button 58 of [to here] is tapped in a case where the subtitle 56 as the notification information is "two seconds after the end", the display ending time point of the subtitle is reset to two seconds after the display ending time point of the subtitle at which the reset button 58 is tapped.

Figure 15B:
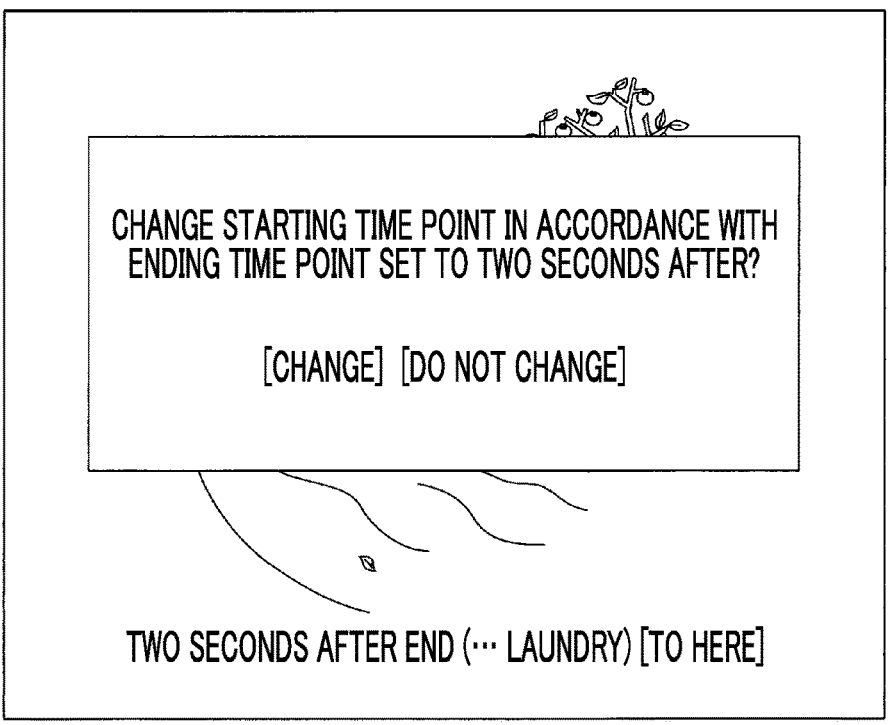

In a case where the display ending time point of the subtitle is reset, a selection screen for selecting whether or not to change the display starting time point in accordance with the reset display ending time point of the subtitle is displayed as illustrated in FIG. 15B.

In step S23, in a case where "do not change" is selected on the selection screen illustrated in FIG. 15B, the playback unit 43 in step S26 plays back the motion picture from three seconds before the reset display ending time point of the subtitle and displays the preview screen using the display control unit 44.

In step S23, in a case where "change" is selected on the selection screen illustrated in FIG. 15B, the reset unit 42 in step S24 changes the display starting time point in accordance with the reset display ending time point of the subtitle. Specifically, in a case where the display ending time point of the subtitle is reset to, for example, two seconds after the display ending time point, the reset unit 42 changes the display starting time point to two seconds after the display starting time point in accordance with the reset display ending time point. In addition, in a case where the display ending time point of the subtitle is reset to, for example, two seconds before the display ending time point, the reset unit 42 changes the display starting time point to two seconds before the display starting time point in accordance with the reset display ending time point.

In step S25, the playback unit 43 plays back the motion picture from three seconds before the reset display starting time point of the subtitle and displays the preview screen using the display control unit 44.

Next, a modification example of the display screen of the terminal apparatus 20 in the editing mode will be described.

Figure 16A:
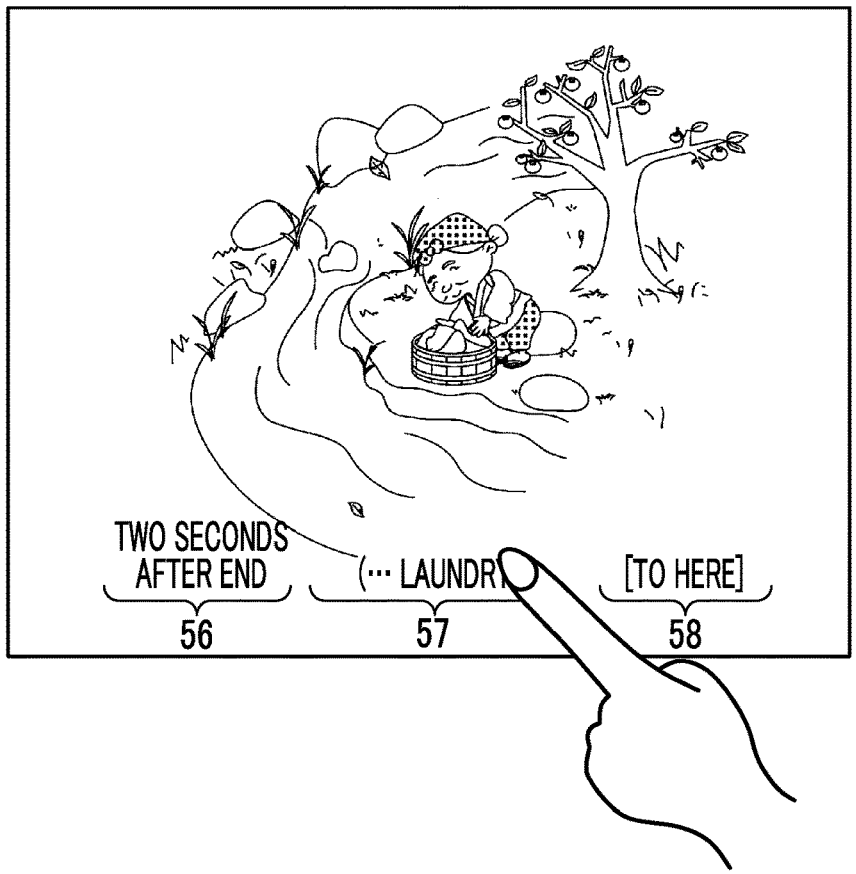
FIG. 16A and FIG. 16B are diagrams illustrating one example of the display screen displayed on the terminal apparatus 20.
Figure 16B:

FIG. 16A and FIG. 16B illustrate one example of the display screen of the terminal apparatus 20 in the editing mode. As illustrated in FIG. 16A, on the display screen in the editing mode, the subtitle 57 as the specific information is displayed at a specific time before the display starting time point of the subtitle or a specific time after the display ending time point. The subtitle 57 is at least a part of the subtitle set in the motion picture and is displayed by omitting a part of the subtitle set in the motion picture.

In a case where the subtitle 57 or a vicinity of the subtitle 57 in which a part of the subtitle is omitted as illustrated in FIG. 16A is tapped, the display control unit 44 displays the subtitle 57 having omission without omission as illustrated in FIG. 16B.

In addition, after an elapse of a certain time from the display of the full text of the subtitle 57 without omission as illustrated in FIG. 16B, or in a case where the subtitle 57 or the vicinity of the subtitle 57 displayed without omission is tapped, the display control unit 44 displays the subtitle 57 in which a part of the subtitle is omitted as illustrated in FIG. 16A.

As described above, even with a terminal apparatus such as the terminal apparatus 20 having a smaller display screen than the terminal apparatus 30, the subtitles such as the notification information and the specific information may be displayed in overlay on the motion picture while the motion picture is being played back in the full screen display state, and the user may adjust the display timing of the subtitle forward or rearward while playing back and checking the motion picture on the display screen. That is, even before the subtitle is displayed or after the subtitle is displayed in the motion picture, the display timing may be adjusted forward or rearward while the subtitle being displayed or the subtitle displayed in the motion picture and the display timing of the subtitle are being checked.

The exemplary embodiment is described using a case where the display timing is adjusted forward or rearward using the terminal apparatus 20. However, the present invention is not limited to the exemplary embodiment and may also be applied to a case where the terminal apparatus 30 is used.

In addition, the exemplary embodiment is described using a case where the display timing of the subtitle provided to the motion picture is adjusted. However, the present invention is not limited to the exemplary embodiment and may also be applied to a case where the display timing of the subtitle obtained by performing voice recognition on the voice of the motion picture is adjusted.

In the embodiments above, the term "processor" refers to hardware in abroad sense. Examples of the processor include general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory; and
a processor,
wherein the memory stores a motion picture, a first subtitle set in the motion picture, and a display starting time point and a display ending time point of the first subtitle, and
the processor is configured to
display the first subtitle on a first region in the motion picture being played back in accordance with a current playback time point, wherein the first subtitle is superimposed onto the motion picture and describes image contents in the motion picture at the current playback time point, and
display a second subtitle as notification information on a second region in the motion picture, wherein the second region is different from the first region,
wherein the second subtitle is superimposed onto the motion picture while the motion picture is being played back to notify a user the display starting time point of the first subtitle, wherein the display starting time point of the first subtitle is an amount of time for which the first subtitle has been being displayed or to be displayed from the current playback time point, or
wherein the second subtitle is superimposed onto the motion picture while the motion picture is being played back to notify the user the display ending time point of the first subtitle, wherein the display ending time point of the first subtitle is an amount of time for which the first subtitle has been stopped being displayed or to be stopped being displayed from the current playback time point.

2. The information processing apparatus according to claim 1,
wherein the processor is configured to
display the second subtitle in the motion picture even in a state where the current playback time point is not displayed in the motion picture being played back.

3. The information processing apparatus according to claim 1,
wherein the processor is configured to, in a case of displaying the second subtitle in the motion picture, display, in the motion picture, information for resetting the display starting time point or the display ending time point of the first subtitle set in the motion picture.

4. The information processing apparatus according to claim 2,
wherein in a case of displaying the second subtitle in the motion picture, the processor is configured to
display, in the motion picture, information for resetting the display starting time point or the display ending time point of the first subtitle set in the motion picture.

5. The information processing apparatus according to claim 3,
wherein the processor is further configured to, in a case where the display starting time point or the display ending time point of the first subtitle is reset,
display information for selecting whether or not to change the display ending time point or the display starting time point of the first subtitle in accordance with the reset display starting time point or the reset display ending time point of the first subtitle in the motion picture.

6. The information processing apparatus according to claim 3,
wherein the processor is configured to,
in a case where the display starting time point or the display ending time point of the first subtitle is reset, play back the motion picture from a preset time before the reset display starting time point or the reset display ending time point of the first subtitle.

7. The information processing apparatus according to claim 1,
wherein the processor is configured to
switch between an editing mode in which the second subtitle is displayed in the motion picture and a playback mode in which the motion picture is played back without displaying the second subtitle in the motion picture.

8. The information processing apparatus according to claim 7,
wherein the processor is configured to, in the editing mode,
display the second subtitle in the motion picture even in a state where the playback time point of the motion picture is not displayed.

9. A non-transitory computer readable medium storing a program causing a computer to execute a process, the process comprising:
storing a motion picture, a first subtitle set in the motion picture, and a display starting time point and a display ending time point of the first subtitle; and
displaying the first subtitle on a first region in the motion picture being played back in accordance with a current playback time point, wherein the first subtitle is superimposed onto the motion picture and describes image contents in the motion picture at the current playback time point, and
displaying a second subtitle as notification information on a second region in the motion picture, wherein the second region is different from the first region,
wherein the second subtitle is superimposed onto the motion picture while the motion picture is being played back to notify a user the display starting time point of the first subtitle, wherein the display starting time point of the first subtitle is an amount of time for which the first subtitle has been being displayed or to be displayed from the current playback time point, or wherein the second subtitle is superimposed onto the motion picture while the motion picture is being played back to notify the user the display ending time point of the first subtitle, wherein the display ending time point of the first subtitle is an amount of time for which the first subtitle has been stopped being displayed or to be stopped being displayed from the current playback time point.

10. An information processing apparatus comprising:
a memory; and
a processor,
wherein the memory stores a motion picture, a subtitle set in the motion picture, and a display starting time point and a display ending time point of the subtitle, and
the processor is configured to
display the subtitle in the motion picture being played back in accordance with a current playback time point and display notification information in the motion picture, wherein the notification information is to notify a user that the display starting time point of the subtitle is started at a specific time before or after the current playback time point, and wherein the notification information is displayed at the specific time, or wherein the notification information is to notify the user that the display ending time point of the subtitle is ended at another specific time before or after the current playback time point, and wherein the notification is displayed at the another specific time, and in a case of displaying the notification information in the motion picture, display, in the motion picture, information for resetting the display starting time point or the display ending time point of the subtitle set in the motion picture.

* * * * *